Oct. 17, 1944.　　　T. DE PORT　　　2,360,333
COMBINED TAKE OFF AND LANDING FLAP AND CONTROL MECHANISM THEREFOR
Filed Nov. 18, 1941　　　7 Sheets-Sheet 1

INVENTOR
THEOPHILE DE PORT
BY
ATTORNEYS

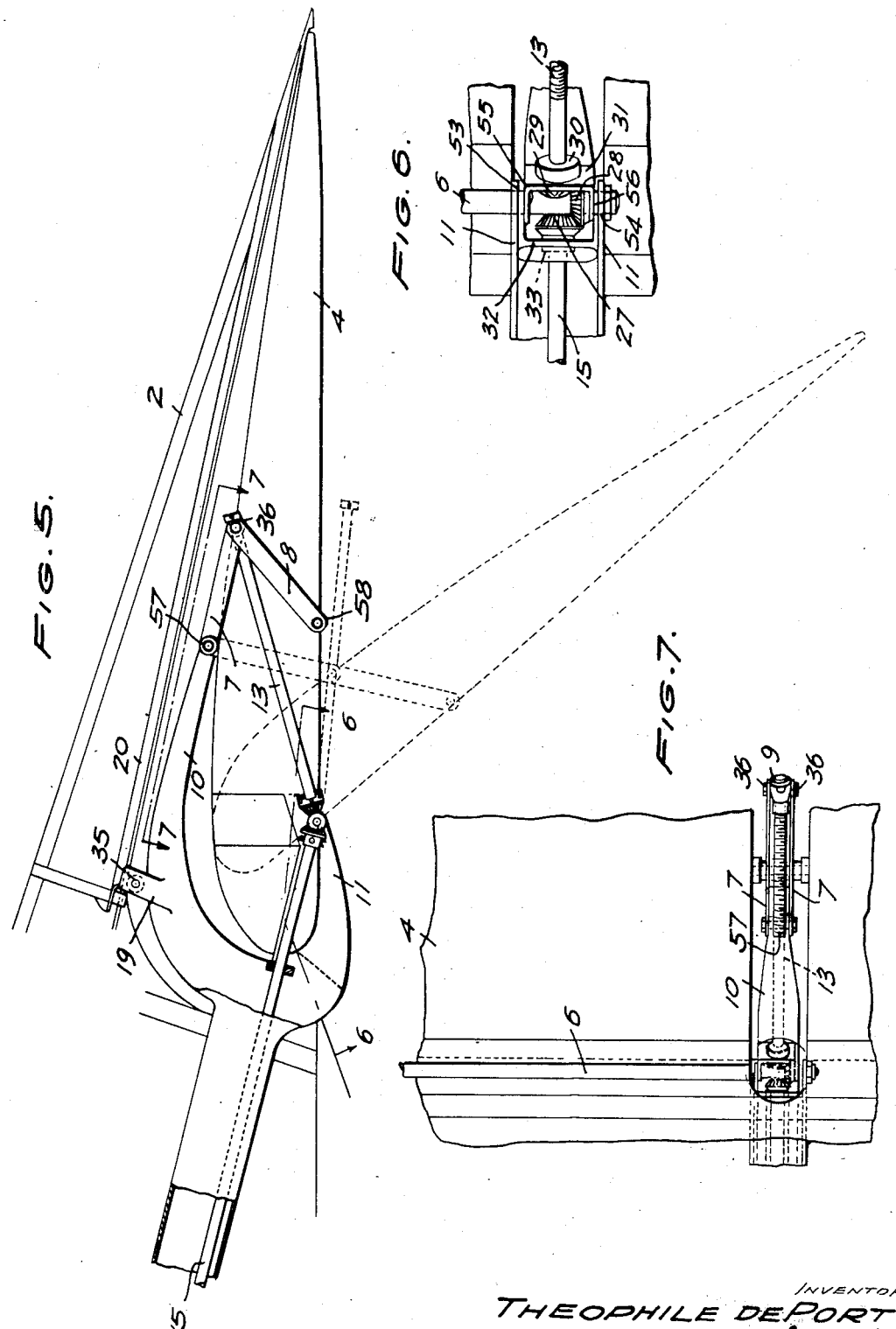

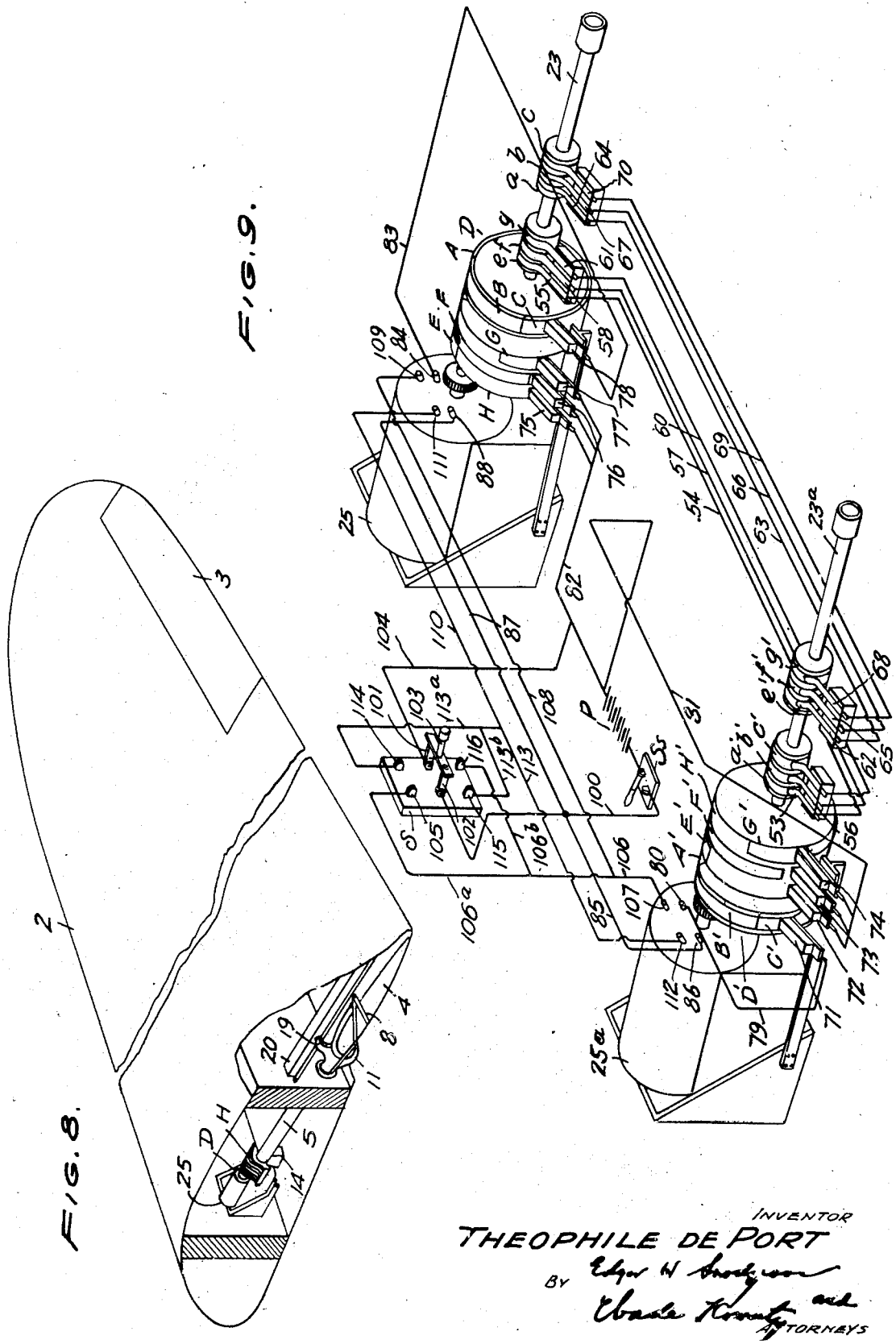

Oct. 17, 1944. T. DE PORT 2,360,333
COMBINED TAKE OFF AND LANDING FLAP AND CONTROL MECHANISM THEREFOR
Filed Nov. 18, 1941 7 Sheets-Sheet 4

INVENTOR
THEOPHILE DE PORT
BY
ATTORNEYS

Oct. 17, 1944. T. DE PORT 2,360,333
COMBINED TAKE OFF AND LANDING FLAP AND CONTROL MECHANISM THEREFOR
Filed Nov. 18, 1941 7 Sheets-Sheet 5
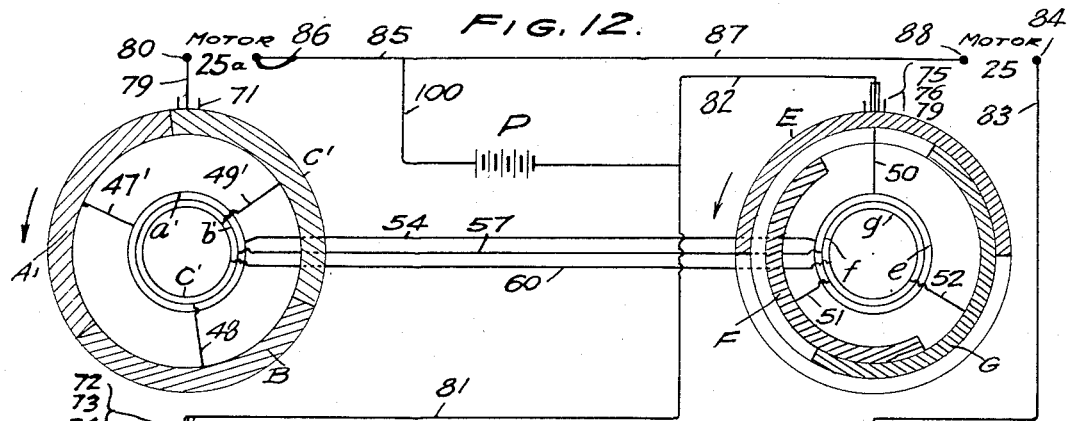
FIG. 12.
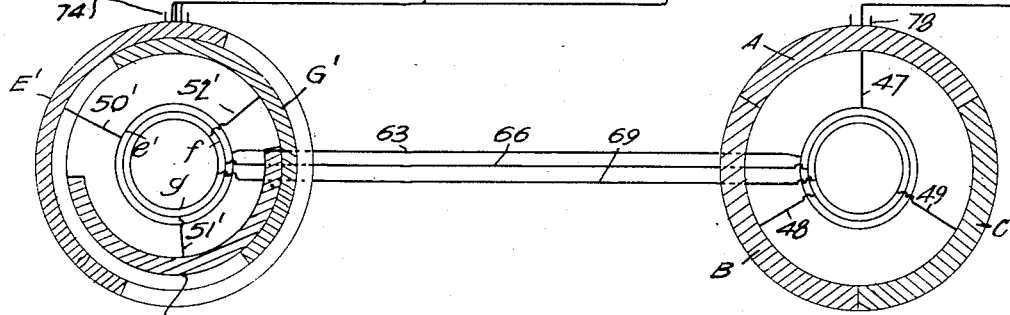
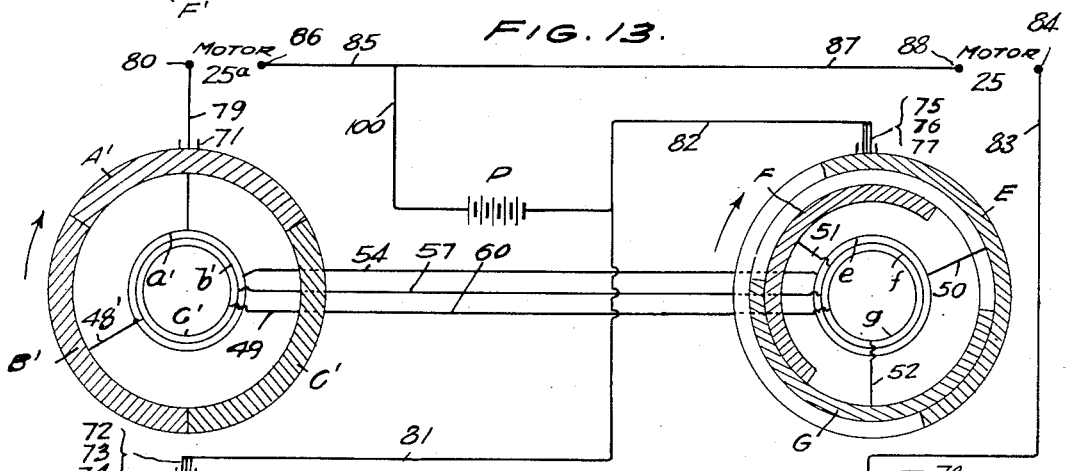
FIG. 13.
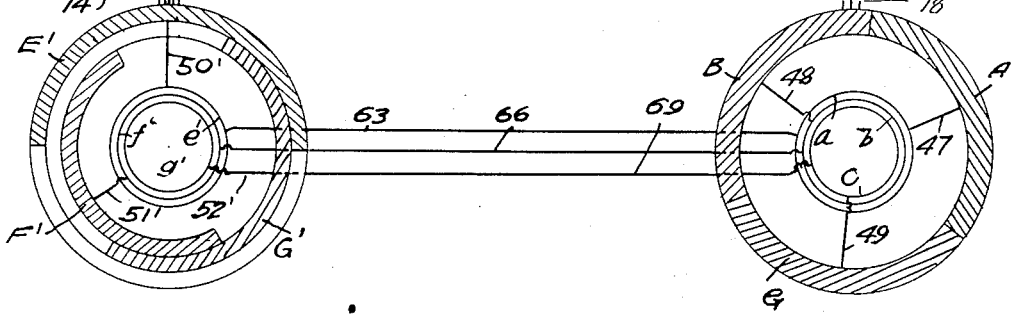
INVENTOR
THEOPHILE DE PORT
BY
ATTORNEYS

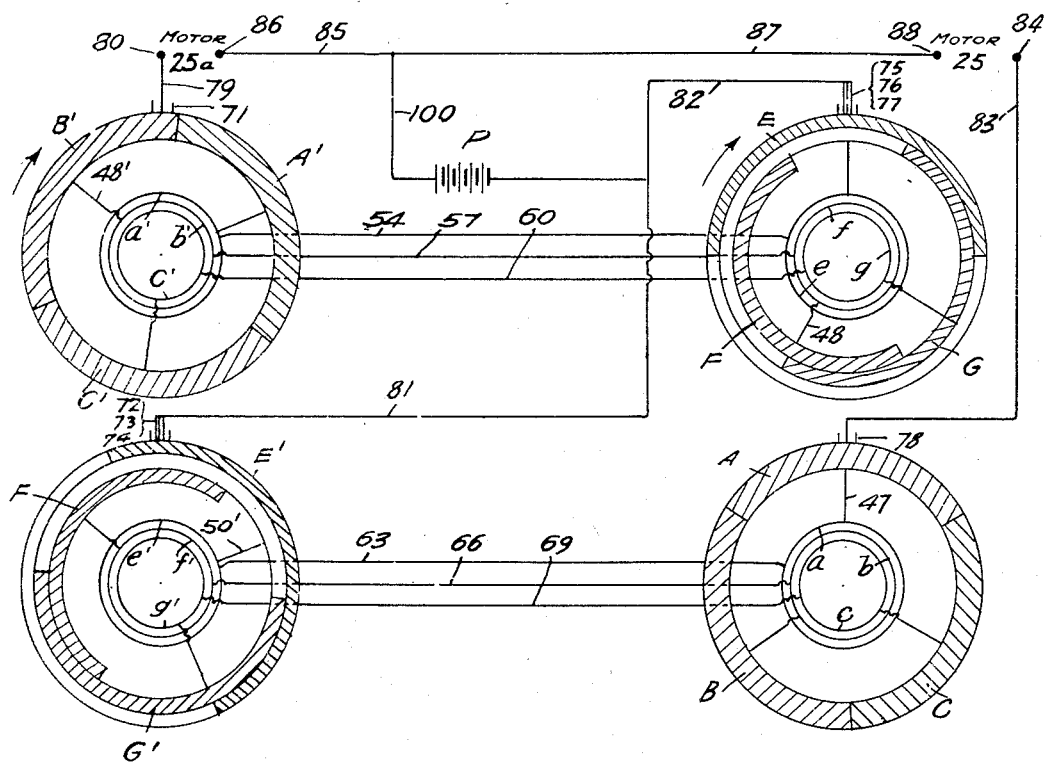

Oct. 17, 1944.  T. DE PORT  2,360,333
COMBINED TAKE OFF AND LANDING FLAP AND CONTROL MECHANISM THEREFOR
Filed Nov. 18, 1941  7 Sheets-Sheet 7
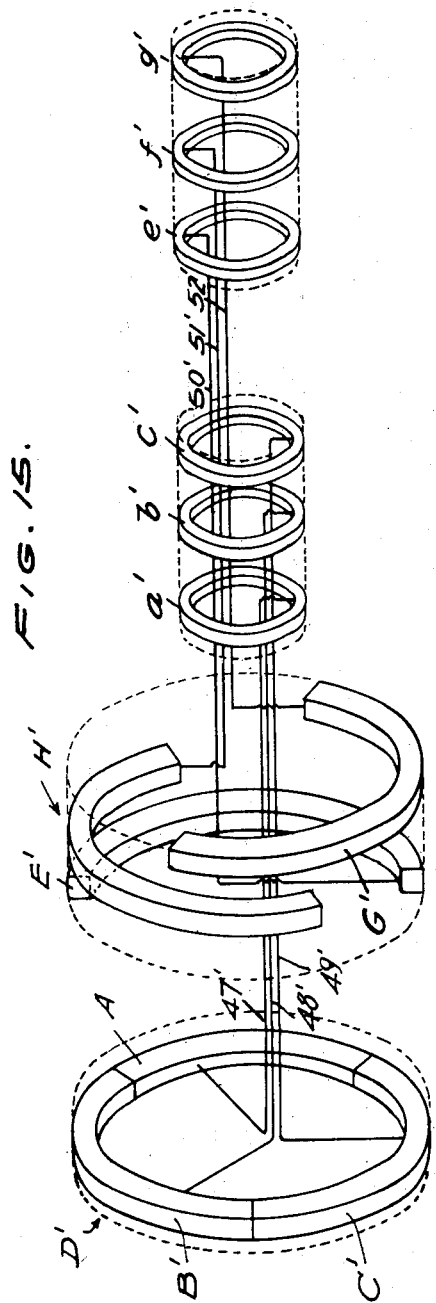
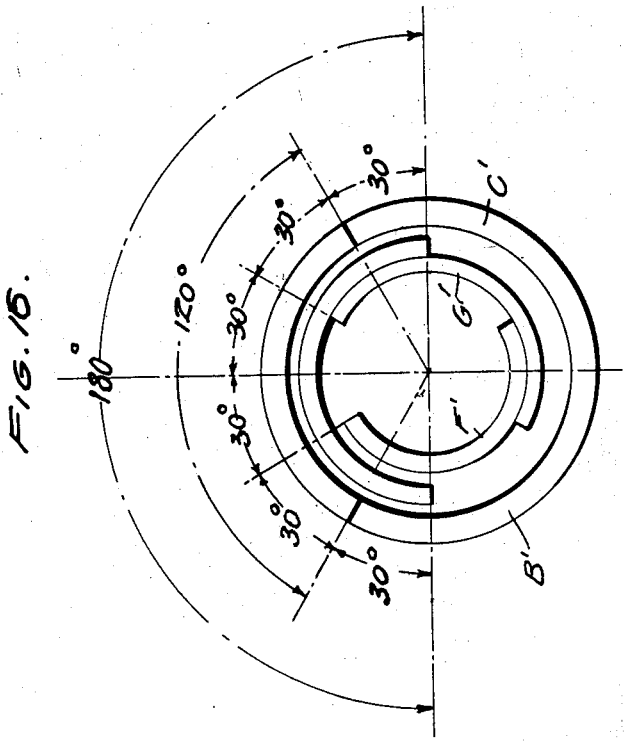
INVENTOR
THEOPHILE DE PORT
ATTORNEYS Patented Oct. 17, 1944

2,360,333

UNITED STATES PATENT OFFICE 2,360,333

COMBINED TAKE-OFF AND LANDING FLAP AND CONTROL MECHANISM THEREFOR

Theophile de Port, New Carlisle, Ohio

Application November 18, 1941, Serial No. 419,613

3 Claims. (Cl. 244—42)

(Granted under the act of March 3, 1883, as amended April 30, 1928; 370 O. G. 757)

The invention described herein may be manufactured and used by or for the Government for governmental purposes, without the payment to me of any royalty thereon.

This application is a continuation in part of my co-pending application Serial No. 289,240, filed August 9, 1939.

This invention relates to an airplane wing, and particularly to an auxiliary flap and control means therefor.

The use of split flaps, pivoted to the wings and operable as a brake for increasing the drag so as to enable the plane to land at a steeper angle and at a lower speed, is well known.

It is also well known to provide airplane wings with auxiliary wings rearwardly movable to increase the lift without appreciably increasing the drag. This increased lift reduces the length of run when taking off. Because of the increase in drag, the split flap is of little, if any, benefit in take-off. The extensible flap is somewhat detrimental to landing because it causes the airplane to float.

It is, therefore, an object of this invention to provide a member and associated control mechanism constituting a combined take-off and landing flap which will efficiently perform the functions of each and which, when performing one function, does not have the detrimental properties of the other.

It is also an object of this invention to provide new and novel control mechanism for causing the inboard and outboard edges of the flap to reciprocate substantially abreast of each other.

Other objects of the invention will become apparent from the following description.

In the drawings:

Fig. 5 is an enlarged detail view of the trailing edge of the wing showing the flap in faired position in full lines and in tilted position in dotted lines;

Fig. 6 is a detail view taken generally along the lines 6—6 in Fig. 5;

Fig. 7 is a detail view taken along the lines 7—7 of Fig. 5;

Fig. 8 is a perspective view of a wing incorporating the extensible and tiltable flap and the commutator and slip ring construction for maintaining equality of advance of the edges of the flap;

Fig. 9 is a view showing an arrangement for electrically connecting the two motors, one of which drives the inboard and the other the outboard edge of the flap, so that the edges will reciprocate substantially abreast.

Fig. 12 is a similar view but showing the arrangement of the commutators and brushes when the flap is moving to extended position and the outboard edge of the flap is lagging by more than a predetermined amount.

Fig. 13 is a similar view showing the relative positions of the commutators and brushes with the outboard edge leading in return by more than a predetermined amount.

Fig. 14 shows the relative positions of the commutators and brushes when the inboard edge is leading in return by more than a predetermined amount;

Fig. 15 is an exploded perspective view of the commutators and brushes showing the wiring thereof; and Fig. 16 is a schematic view showing the angular arrangement of the commutator segments.

Figure 1:
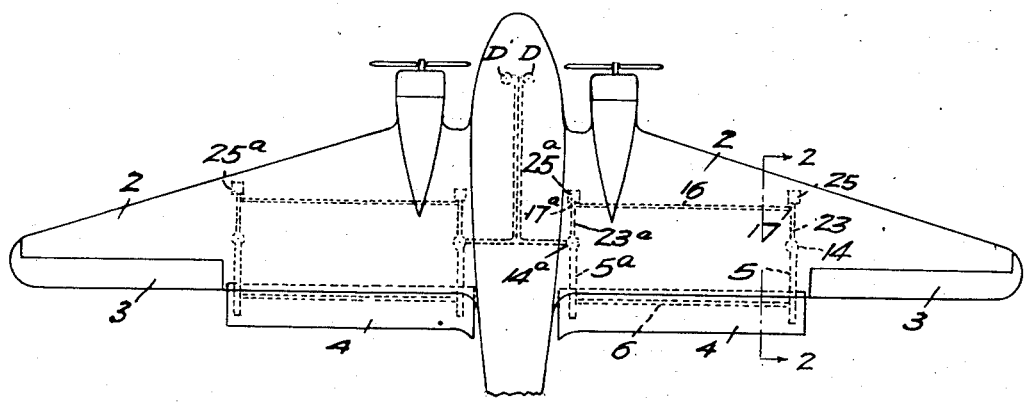
Fig. 1 is a plan view of an airplane incorporating the invention with the flap in the extended position as in Fig. 4.

Referring to the drawings, and particularly to Fig. 1, the airplane wings 2 are each provided with the usual ailerons 3 and a combined air brake and take-off flap 4.

Since the structure in each wing is the same, the construction and arrangement of the parts in one wing only will be described.

Wing 2 is formed with a recessed portion 12 in the under trailing edge thereof for normally receiving the combined take-off and landing flap 4. Flap 4 is freely tiltably mounted on rod 6, which, in turn, is carried with freedom for rotative movement by carrier members 5 and 5a, slidably supported in the wing.

Figure 4:
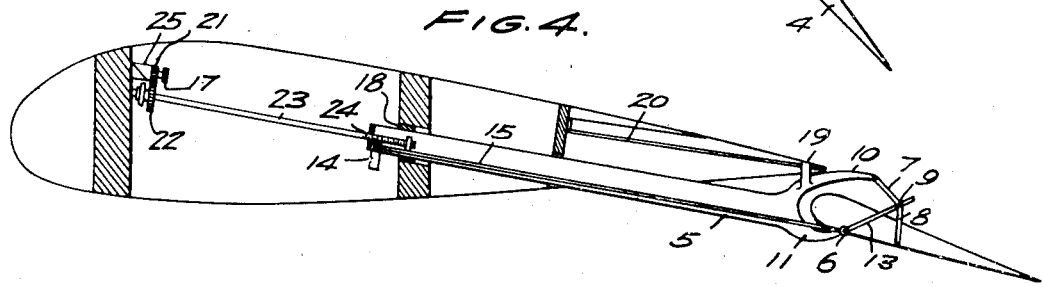
Fig. 4 is a cross-sectional view taken along the same lines as Figs. 2 and 3 showing the flap in extended position to aid in take-off.

As shown in Fig. 4, member 5 is suitably supported for sliding movement by a bearing 18 in the wing and a bracket 19 on member 10 slidably engaging a guide 20 in the wing. Member 5a is similarly supported and guided. Motor 25 is drivingly connected by suitable gears 21 and 22 to threaded shaft 23 (Fig. 4) which in turn operatively engages an internally threaded portion 24 of carrier member 5 to reciprocate the latter. Motor 25a is similarly connected to shaft 23a to reciprocate inboard member 5a.

Sprocket chain 16, operatively engaging suitable sprockets 17 and 17a on the driving shafts of motors 25 and 25a respectively, insures identity of rotation of the rods and consequently equality of sliding movement of the inboard and outboard edges of the flap in the embodiment of the invention illustrated in Figs. 1 to 7.

Figure 2:
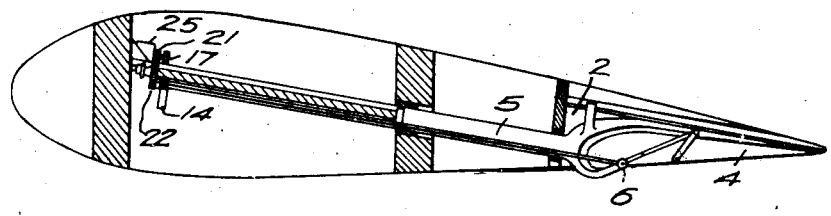
Fig. 2 is a cross-sectional view taken generally along the lines 2—2 of Fig. 1 but showing the flap in retracted and faired position.
Figure 3:
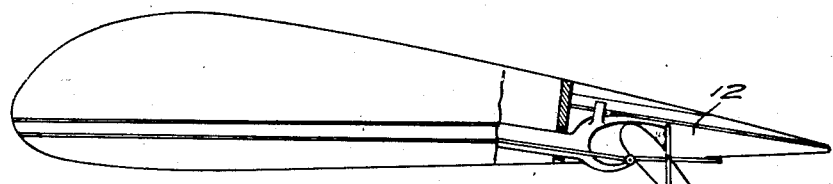
Fig. 3 is a cross-sectional view taken generally along the same lines as in Fig. 2 but showing the flap in tilted position to aid in landing.

Operation of the motors 25 and 25a will cause the carriers 5 and 5a and flap 4 to move from the retracted position shown in Fig. 2 to the extended position shown in Fig. 4 and vice versa.

Suitable switches actuated by carriers 5 and 5a may be provided to break the electric circuit to motors 25 and 25a to terminate operation of the motors when the carriers reach their extreme positions.

Motive power for tilting flap 4 is provided by motors 14a and 14 mounted on carriers 5a and 5 drivingly connected with the inboard and outboard edges, respectively, of the flap. Since the mechanism is the same at each edge, that associated with outboard motor 14 only will be described. Motor 14 is geared to rotate rod 15 and gear 27, integral therewith (Fig. 6). Gear 27 meshes with a gear 28, integral with rod 6 which in turn is rotatably mounted in forked portion 11 of member 5. Gear 28 also meshes with gear 29 which, in turn, is integral with rod 13. The outer end of rod 15 is supported by bracket 32 which, in turn, is supported on rod 6 by having rod 6 extend through suitable openings 53 and 54 in bracket 32. Thrust bearing 33 prevents longitudinal movement of rod 15. Rod 13 is carried by bracket 31 which in turn is supported by rod 6 by having the rod extend through openings 55 and 56 in the bracket in the same manner as bracket 32. A thrust bearing 30 prevents longitudinal movement of rod 13. As shown in Figs. 5 and 7, the outer end of the rod 13 is threaded to engage nut 9. The inner ends of the pairs of links 7 and 8 are pivotally connected to nut 9 by stud bolts 36. The outer ends of links 7 are pivotally connected to portion 10 of member 5 by pin 57, and the outer ends of links 8 are pivotally connected to flap 4 by pin 58. Rotation of rod 13, when the links are in the solid line position in Fig. 5, straightens the links out and tilts the flap to the position shown in dotted lines. Motor 14 is reversible to rotate rods 13 and 15 in the opposite direction causing the links to jack-knife and the flap to be retracted.

In the position of the links, as shown in Fig. 4, the flap 4 is tilted to give the desired camber to the airfoil section during take-off.

Uniform tilting of the ends of the flap 4 is insured by shaft 6, geared to be driven by both the inboard motor 14a and outboard motor 14.

The degree of tilt of each flap may be indicated by suitable gauges D, D' (Fig. 1). These gauges may be operatively connected to the flap tilting mechanism in any suitable manner by electric means or by means of a flexible cable geared to be rotated by shaft 15. It is to be understood that the cable or electric wiring would be provided with sufficient slack to allow movement of the carrier within the limits of its operation.

Equality of reciprocatory movement of the inboard and outboard edges of the flap to and from the extended position may be effected by other mechanisms. For instance, the motors may be electrically connected to a source of power so that in the event one edge of the flap leads the other by more than a predetermined amount, the motor driving the leading edge will cease to operate until the trailing edge catches up, at which time both motors will again operate.

Mechanism for producing this equality of movement as illustrated in Figs. 9 to 16 will now be described in detail.

Referring to Fig. 9 taken in conjunction with Fig. 1, motors 25 and 25a are of the shunt-wound, reversible type in which reversing of the stator field results in reversing the direction of operation of the motor. Electricity is supplied to the stator field of the motors 25 and 25a from a source of power P through starting and stopping switch Ss and a stator field reversing switch S. The switch S is composed of a pair of pivotally mounted blade elements 101 and 102 connected to move together by means of an insulating handle 103 and connected to the source of power P by conductors 100 and 104.

The motors are wired to the switch S in such a manner that when the switch is in the "up" position with blades 101 and 102 in contact respectively with contacts 114 and 105, electricity will flow through them in one direction, and when the switch is in the "down" position with blades 101 and 102 in contact respectively with contacts 116 and 115, electricity will flow through them in the opposite direction. To effect this result when the switch S is in the "up" position and switch Ss closed, electricity flows to the motor 25a through switch Ss, conductor 100, blade 102, contact 105, conductors 106a and 106, to connector 107 on motor 25a. The circuit through the motor is completed by means of connector 112, conductors 113 and 113a, contact element 114, blade 101, and conductor 104, to the other side of the source of power P.

Electricity is supplied to the stator field of motor 25 by means of switch Ss, conductor 100, blade 102, contact 105, conductors 106a and 108 to connector 109, thence from connector 111 through conductors 110 and 113a, contact 114, blade 101, and conductor 104 to the other side of the source of power.

With the switch in the "down" position, electricity flows through the stator winding in the opposite direction. Starting with the switch Ss, through conductor 100, blade 102, contact element 115, conductors 113b and 113, to connector 112, thence to connector 107, conductors 106 and 106b, contact 116, blade 101, and conductor 104, to the other side of the source of power. The stator winding in motor 25 is supplied through switch Ss, conductor 100, blade 102, contact element 115, and conductor 113b as previously described, thence to conductor 110 and contact 111. The circuit is completed through contact 109, conductors 108, 106 and 106b, contact 116, blade 101, and conductor 104 to the other side of the source of power.

Coming now to the structure for supplying current to the rotor winding of the motor which is lagging by more than a predetermined amount, and for cutting off the electricity to the rotor winding of the motor which is leading by more than a predetermined amount, there is provided a commutator and slip ring system carried by and rotatably mounted with the rods which drive the flaps to and from extended position, for interconnecting the motors to a source of power.

The specific details of this commutator and slip ring construction will now be described.

Referring to Fig. 15 taken in conjunction with Fig. 9, the commutator system includes a pair of commutators and six slip rings carried by each of rods 23 and 23a. One of the commutators, D', carried by shaft 23a comprises three commutator segments, A', B', and C', each of which extends 120° circumferentially. These segments are suitably insulated from the rod 23a and from one another, are in non-overlapping relationship circumferentially, and are electrically connected respectively by conductors 47', 48', and 49', to slip rings a', b', and c'. The other commutator, H', comprises three commutator segments, E', F', and G', each of which extends through an arc of 180° and overlaps the other two by 60°. Segments E', F', and G' are respectively electrically connected by conductors 50', 51', and 52', to slip rings e', f', and g', which are also carried by and suitably insulated from rod 23a.

The angular relationship of the commutator segments will now be described. Segments A', B', and C' are respectively symmetrically disposed circumferentially with respect to segments E', F', and G'. In view of the fact that the relationship of segments A' to E' is identical with that of B' to F', and C' to G', the relationship of segments A' to E' only will be described. As shown in Fig. 16, segment E' extends 30° beyond each end of segment A'. Segment E' overlaps segment G' by 60° and segment F' by 60° also, while segments F' and G' overlap segment A' by 30°. This angular relationship of segments is the preferred one, but it is obvious that the overlapping relationship may be varied within limits as long as current is furnished to the motors to produce the desired result.

Shaft 23 is provided with an identical arrangement comprising a commutator D having segments A, B, and C, each subtending an arc of 120° and arranged in non-overlapping relationship, as well as slip rings e, f, and g electrically connected by conductors 47, 48 and 49 correspondnig to conductors 47', 48', and 49'. This system also includes a commutator H provided with three commutator segments. E, F, and G, each of which is arranged to subtend an arc of 180°, to overlap the other two by an arc of 60°, and electrically connected by conductors 50, 51, and 52 to slip rings e, f, and g, carried by and insulated from the rod 23. All of this structure is identical with the corresponding structure shown in Fig. 15.

Referring to Fig. 9, taken in conjunction with Fig. 15, it will be noted that certain of the commutator segments are electrically interconnected by means of a system of brushes and commutators.

Thus, commutator segments A and E' are electrically connected by slip rings a and e', brushes 64 and 62 and conductor 63 (it being understood that the commutator segments and slip rings are electrically connected as shown in Fig. 15); segments B and F' by slip rings b and f', brushes 67 and 65, and conductor 66; segments C and G' by slip rings c and g', brushes 70 and 68 and conductor 69.

Similarly, segments E and A' are connected by slip rings e, and a', brushes 58 and 53, and conductor 54; segments F and B' by slip rings f and b', brushes 58 and 56, and conductor 57; segments G and C' by slip rings g and c', brushes 61 and 59 and conductor 60.

The brushes associated with the slip rings are constantly in contact therewith. The brushes associated with the commutator segments are adapted to successively contact the same. Thus, commutator segments A', B' and C' are adapted to successively engage brush 71—which, in turn, is connected by conductor 79 to connector 80 of motor 25a. Operatively associated with commutator segments E', F' and G' respectively are brushes 72, 73 and 74. These brushes are connected together and—by means of conductor 81—to one terminal of a source of power P. Similarly, commutator segments A, B and C are adapted to engage brush 78 which is connected by conductor 83 to connector 84 of motor 25. Segments E, F and G have associated therewith respectively brushes 75, 76 and 77 connected together and—by means of conductor 82—to one side of the source of power P.

The electrical circuits to the stator fields of the motors 25 and 25a are controlled by the relative angular positions of shafts 23 and 23a and consequently the angular positions of commutators D' and H' on shaft 23a with respect to the angular positions of the commutators D and H on shaft 23. These circuits are so arranged that rotor field of motor 23a is energized by a circuit through commutators D' and H, while the rotor field of motor 25 is energized by a circuit through commutators D and H'. Typical circuits will now be described to show that electricity is always supplied to the lagging motor as well as to the leading motor—if it is not leading by more than a predetermined amount—and to the lagging motor only if the other motor is leading by more than a predetermined amount.

Figure 10:
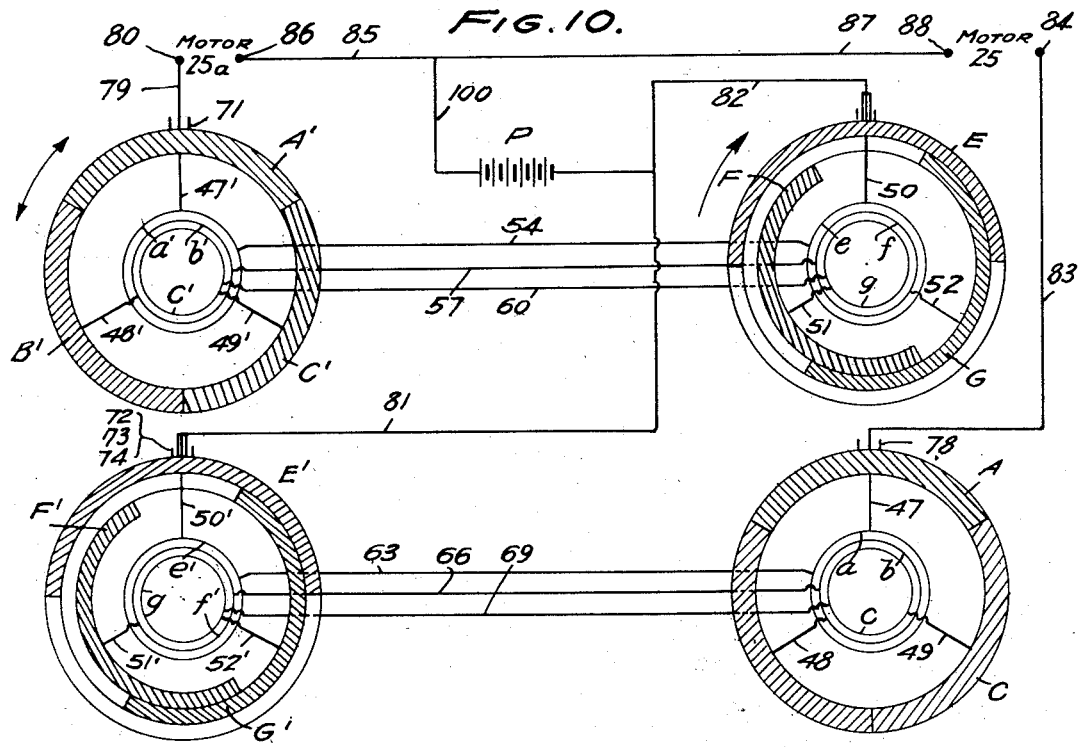
Fig. 10 is a schematic view of the commutator segments showing the relative positions of the segments and brushes when the flap is moving to either extended or retracted position and the two edges of the flap are substantially abreast, the two commutators on each shaft being shown in the same plane with their corresponding slip rings for the sake of clarity.

Referring now to Fig. 10, taken in connection with Figs. 9 and 15, the edges of the flap are abreast and the motors in phase. Current is supplied from one terminal of the source of power P to the rotor of motor 25a by conductors 100 and 85, connectors 86 and 80, conductor 79, brush 71, commutator segment A', slip ring a', brush 53, conductor 54, brush 55, slip ring e, conductor 50, commutator segment E, brush 75 and conductor 82 to the other terminal of the source of power P. Current is supplied to motor 25 from one terminal of the source of power P by conductors 100 and 37, connectors 88 and 84, conductor 83, brush 78, commutator segment A, conductor 47, slip ring a, brush 64, conductor 63, brush 62, slip ring e', conductor 50', commutator segment E', brush 72 and conductor 81, to the other terminal of the source of power P. As long as the motors are in phase with the edges of the flap substantially abreast, current will be supplied to both motors for the following reason:

From the foregoing description it is readily apparent that when the motors are in phase and commutator segments B and B' are in contact with their respective brushes the circuit is complete to motor 25 through commutator segment F' and associated slip rings and wiring, while current is supplied to motor 25a by means of commutator segment F and associated slip rings, brushes and wiring. Similarly, when commutator segments C and C' are in contact with their respective brushes current is supplied to motor 25 through commutator segment G' and associated slip rings, brushes and wiring, while current is supplied to motor 25a through commutator segment G through associated slip rings, brushes and wiring.

Figure 11:
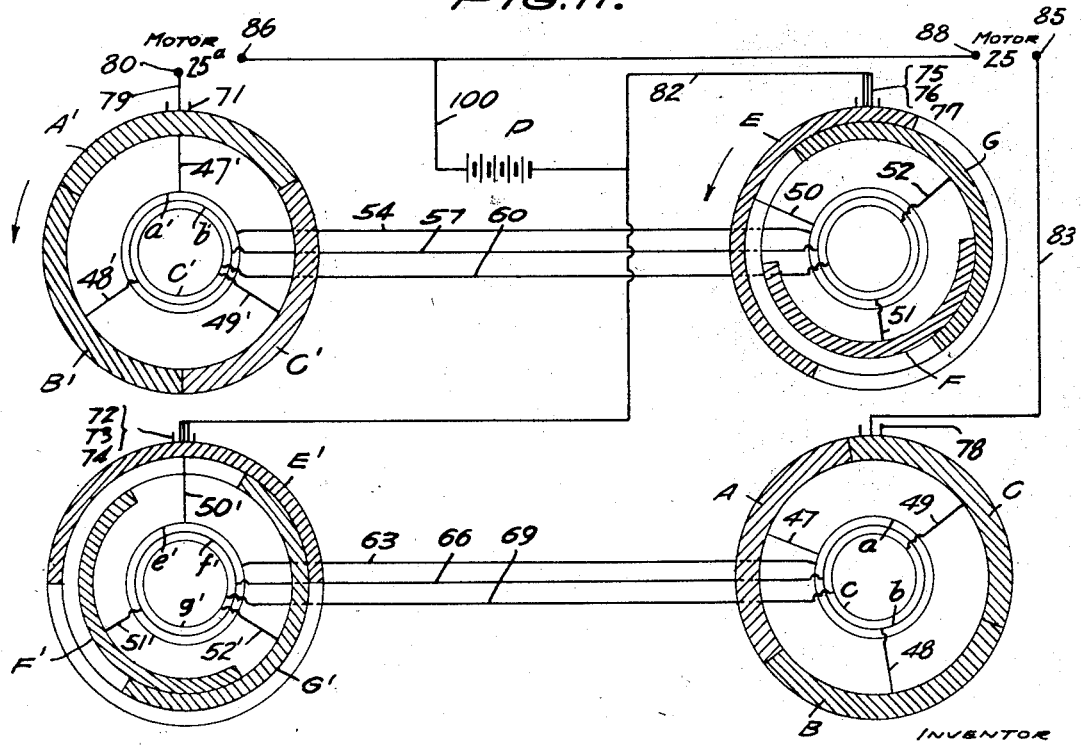
Fig. 11 is a similar view but showing the arrangement of the commutators and brushes when the flap is moving to extended position and the outboard edge thereof is leading by more than a predetermined amount.

Considering now a situation in which one motor is leading by more than a predetermined amount, a circuit will be traced showing how current is supplied to the lagging motor only, current to the leading motor being cut off. Such a situation is illustrated in Fig. 11 with the shafts and consequently the commutators moving in a counter-clockwise direction. Motor 25 is shown to be leading motor 25a sufficiently so that brush 78 is in contact with commutator segment C, while the corresponding brush 71 of motor 25a is still in contact with segment A'. With the parts in this position, current is supplied to motor 25a from one terminal of the source of power P by conductors 100 and 85, connectors 86 and 80, conductor 79, brush 71, commutator segment A', conductor 47', slip ring a', brush 53, conductor 54, brush 55, slip ring e, conductor 50, commutator segment F, brush 75 and conductor 82 to the other terminal of the source of power P. In view of the fact that the commutator segment G' carried by shaft 23a is out of phase with respect to the commutator segment C on shaft 23 by more than a predetermined amount, current to motor 25 will be cut off. In tracing this circuit through, starting with one terminal of the source of power P, through conductors 100 and 87, connectors 88 and 84, conductor 83, brush 78, commutator segment C, conductor 49, slip ring c, brush 70, conductor 69, brush 68, slip ring g', conductor 52', commutator segment G', it will be noted that the commutator segment G' is not in contact with its associated brush 74 and therefore no current will flow.

Coming now to the situation where the motor 25a is leading by more than a predetermined amount, when the flap is being moved to extended position, referring to Fig. 12, current is supplied to the lagging motor 25 from one terminal of the source of power P by conductors 100 and 87, connectors 88 and 84, conductor 83, brush 78, commutator segment A, conductor 47, slip ring a, brush 64, conductor 63, brush 62, slip ring e', conductor 50', commutator segment E', brush 72 and conductor 81 to the other terminal of the source of power. Current is not supplied to leading motor 25a as may be established by tracing the following circuit:

Starting from one terminal of the source of power P, through conductors 100 and 85, connectors 86 and 80, conductor 79, brush 71, commutator segment C', conductor 49', slip ring c', brush 59, conductor 60, brush 61, slip ring g, conductor 52, commutator segment G. It will be noted that commutator segment G is not in contact with its brush 77 and therefore no current will flow.

Coming now to the situation where the flap is being retracted, as shown in Fig. 13, with motor 25 leading by more than a predetermined amount. Current is supplied to the lagging motor 25a from one terminal of the source of power P by conductors 100 and 85, connectors 86 and 80, conductor 79, brush 71, commutator segment A', conductor 47', slip ring a', brush 53, conductor 54, brush 55, slip ring e, conductor 50, commutator segment E, brush 75 and conductor 82 to the other terminal of the source of power.

A circuit will now be traced showing that current is cut off to the leading motor 25. Starting with one terminal of the source of power P through conductors 100 and 87, connectors 88 and 84, conductor 83, brush 78, commutator segment B, conductor 48, slip ring b, brush 67, conductor 66, brush 65, slip ring f', conductor 51' and commutator segment F''. Since commutator segment F'' is not in contact with its brush 73 no current will flow.

Coming now to the situation where—the flap being retracted—the motor 25a is leading by more than a predetermined amount and stopping, the motor 25 lagging by more than a predetermined amount and continuing to operate. Referring to Fig. 14, current to the lagging motor 25 is supplied from one terminal of the source of power P through conductors 100 and 87, terminals 88 and 84, conductor 83, brush 78, commutator segment A, conductor 47, slip ring a, brush 64, conductor 63, brush 62, slip ring e', conductor 50', commutator segment E', brush 72, and conductor 81 to the other terminal of the source of power. Current to the leading motor 25a is cut off as will be shown by tracing the circuit. Starting with one terminal of the source of power P through conductors 100 and 85, connectors 86 and 80, conductor 79, brush 71, commutator segments B', conductor 48', slip ring b', brush 56, conductor 57, brush 58, slip ring f, conductor 48, and commutator segment F. Since commutator segment F is not in contact with its brush 76, current will not flow.

From the above typical circuits it will be apparent that electrical energy will be supplied to the lagging motor only when the lag is by more than a predetermined amount and to both motors when the lag is less than a predetermined amount and that the arrangement is operative to obtain this result when the flap is moving to either the extended or retracted position.

It is to be understood that the invention may take various physical forms, it being intended to be limited only by the appended claims.

I claim:

1. In combination, a pair of driven elements, a source of power, a driving element operatively connected to each driven element, a pair of commutators carried by each driven element, one commutator of each pair comprising three equal segments circumferentially arranged in contiguous non-overlapping relationship, the other commutator of each pair comprising three equal segments circumferentially arranged in predetermined overlapping relationship, each segment of said one commutator being symmetrically disposed with respect to a separate one of the segments of said other commutator, means electrically connecting one commutator of one pair and the other commutator of the other pair to said source of power and one of said driving elements, and means electrically connecting the other commutator of said one pair and one commutator of said other pair to said source of power and to the other of said driving elements.

2. In combination, a pair of driven elements, a source of power, a driving element operatively connected to each driven element, a pair of commutators carried by each driven element, one commutator of each pair comprising three 120° segments circumferentially arranged in non-overlapping relationship, the other commutator of each pair comprising three 120° segments circumferentially arranged in 60° overlapping relationship with respect to each other, the three 120° segments being symmetrically arranged with respect to the three 180° segments, each 120° and 180° segment of one pair being electrically connected to its correspondingly positioned 180° and 120° segment respectively of the other pair, means electrically connecting one commutator of one pair and the other commutator of the other pair to said source of power and to one of said driving elements, and means electrically connecting the other commutator of said one pair and the one commutator of said other pair to said source of power and to the other of said driving elements.

3. In combination, an airplane wing, an extensible and retractable member in said wing, means for moving said member to and from a retracted position comprising motors drivingly connected to the inboard and outboard edges, respectively, of said member, and means for controlling the operation of said motors constructed and arranged so that the motor driving an edge that is leading will cease to drive until the inboard and outboard edges of said member are abreast including a pair of driven elements, one of which is operatively connected to each of said motors, a source of power, a driving element operatively associated with each driven element, a pair of commutators, one commutator being carried by each driven element, said commutators being electrically connected to said source of power and to one of said driving elements, said commutators being constructed and arranged to supply current to both motors when said driven elements are maintaining equality of advance and to the motor driving the lagging element only when that element is lagging by more than a predetermined amount.

THEOPHILE DE PORT.